March 22, 1966 R. F. SHURTZ 3,241,210
REFRACTORY BLOCK MOLDING MACHINE
Filed April 3, 1963 4 Sheets-Sheet 1

INVENTOR.
ROBERT F. SHURTZ
BY
Oberlin, Maky & Donnelly
ATTORNEYS

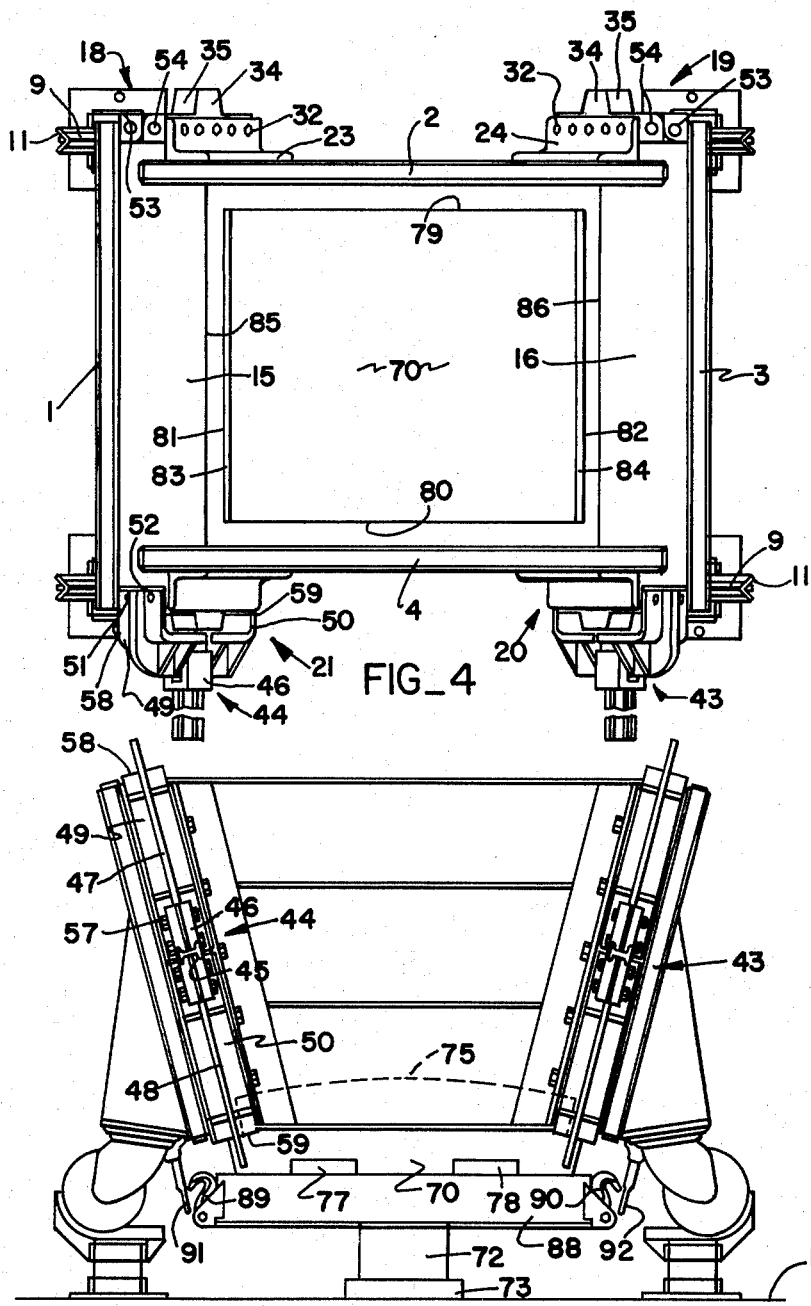

March 22, 1966   R. F. SHURTZ   3,241,210
REFRACTORY BLOCK MOLDING MACHINE
Filed April 3, 1963   4 Sheets-Sheet 3
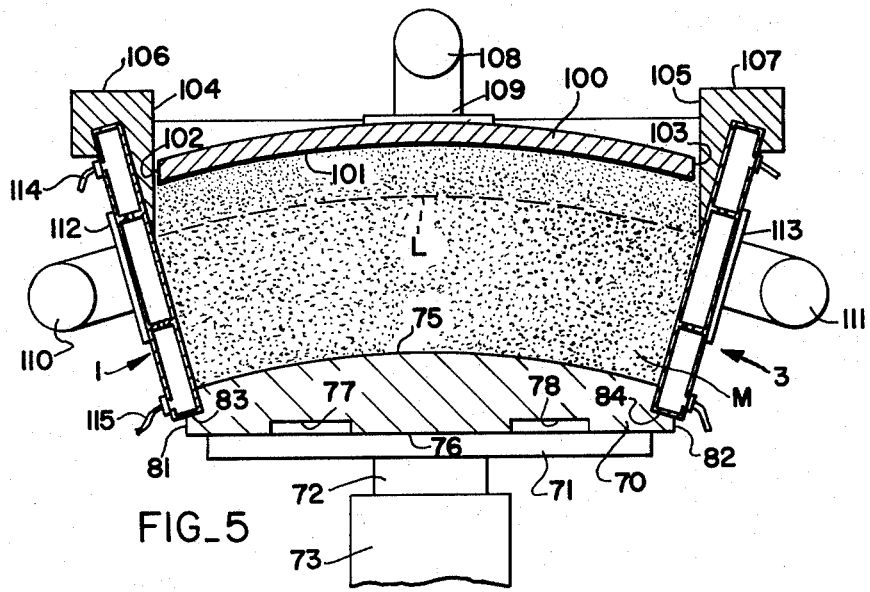
FIG_5
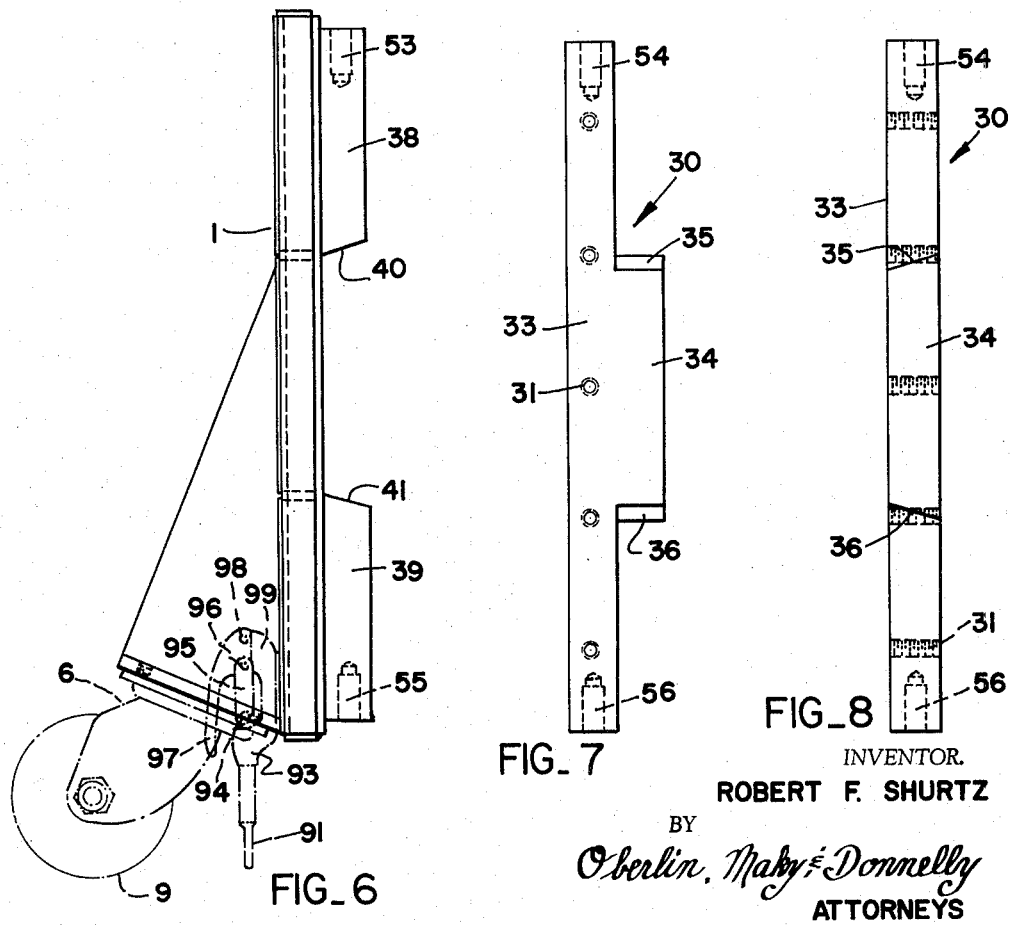
FIG_6   FIG_7   FIG_8
INVENTOR.
ROBERT F. SHURTZ
BY
Oberlin, Maky & Donnelly
ATTORNEYS March 22, 1966 R. F. SHURTZ 3,241,210
REFRACTORY BLOCK MOLDING MACHINE
Filed April 3, 1963 4 Sheets-Sheet 4
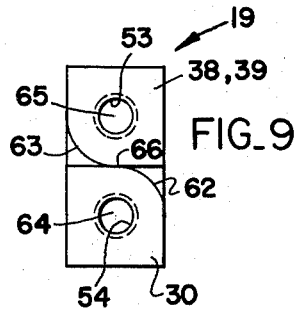
FIG_9
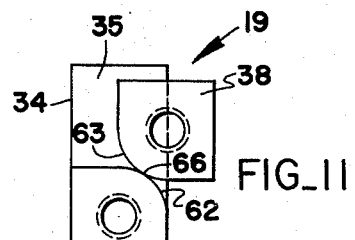
FIG_11
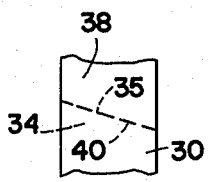
FIG_10
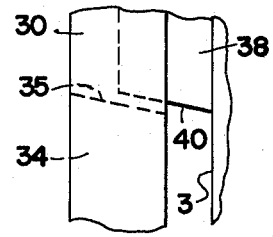
FIG_12
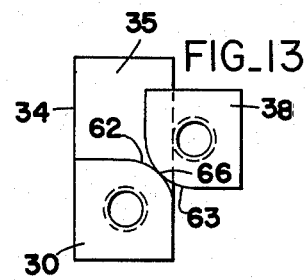
FIG_13
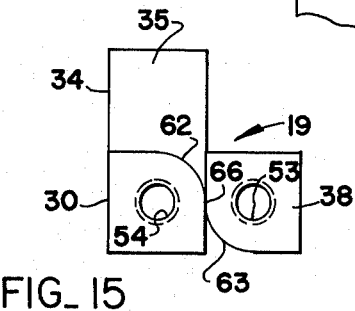
FIG_15
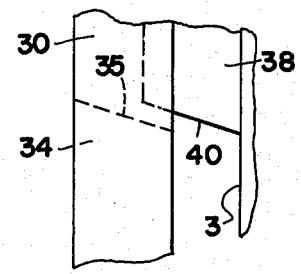
FIG_14
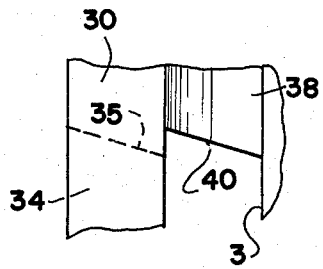
FIG_16
INVENTOR.
ROBERT F. SHURTZ
BY
Oberlin, Maky & Donnelly
ATTORNEYS United States Patent Office 3,241,210
Patented Mar. 22, 1966

3,241,210
REFRACTORY BLOCK MOLDING MACHINE
Robert F. Shurtz, Pepper Pike, Ohio, assignor to Basic Incorporated, Cleveland, Ohio, a corporation of Ohio
Filed Apr. 3, 1963, Ser. No. 270,315
15 Claims. (Cl. 25—41)

This invention relates generally as indicated to a refractory block molding machine and more particularly to a machine for quickly and conveniently pressing, shaping, and setting a heated refractory mix into the desired brick shape.

Refractory brick for the lining of metallurgical furnaces may, for example, be produced by blending a small amount of hot coal tar pitch with a preheated refractory grain material such as dead-burned dolomite and/or dead-burned magnesia, and while such blend is hot, it may be compressed into the desired brick shape. However, the material must be cooled sufficiently so that it will retain its shape and not be subject to slump or deformation upon removal from the machine and subsequent handling. In the manufacture of such brick, especially large brick for the more recently developed oxygen furnaces, a time consuming tamping operation is usually involved. Moreover, the molding apparatus is required to contain the shaped block until it has cooled sufficiently for subsequent stripping and removal. This, needless to say, is a time consuming operation.

It is accordingly a principal object of the present invention to provide a molding machine capable of quickly and conveniently producing refractory blocks.

It is another important object to provide a molding machine which will thus produce quite large refractory blocks and from which such blocks may readily be stripped and subsequently handled.

Still another important object is the provision of a refractory block molding machine which with a few minor modification can produce block of varying radial thicknesses and circumferential extent.

Another object is the provision of such refractory block molding machine wherein the mold box may readily be expanded to facilitate stripping of the block after the material has sufficiently rigidified.

Yet another object is the provision of such expansible mold box wherein the walls are tightly locked together when such box confines the refractory material.

Another object is the provision of a hinged mold box for refractory materials having a unique locking structure when closed.

Still another object is the provision of a refractory block molding machine for the production of large block shapes by vibration compacting.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 3 is a side elevation of such machine similar to FIG. 1, but showing the molding machine in its open position;

FIG. 4 is a top plan view of the molding machine in its open position again with the hinge actuators at the top of such view omitted for clarity of illustration;

FIG. 5 is a schematic vertical section of the machine taken substantially on the line 5—5 of FIG. 2 illustrating additionally a follower plate for compacting the refractory material and guides therefor;

FIG. 6 is an enlarged end elevation of one of the permanent ends of the molding machine showing the hinge blocks thereon;

FIG. 7 is a similar enlarged view of the cooperating hinge block on the temporary ends of the molding machine;

FIG. 8 is a view of the hinge block of FIG. 7 as seen from the right thereof;

FIG. 9 is an enlarged schematic top plan view illustrating the hinge blocks in their closed position;

FIG. 10 is a fragmentary side elevation of the hinge blocks shown in FIG. 9 illustrating the tight joint achieved thereby;

FIG. 11 is a top plan view similar to FIG. 9 illustrating the hinge blocks rotated 30° open;

FIG. 12 is a fragmentary side elevation of the opening of the wedge block surfaces of the hinge blocks achieved by the position of FIG. 11;

FIG. 13 is a view similar to FIG. 11 illustrating the hinge blocks rotated 60° open;

FIG. 14 is a view similar to FIG. 12 illustrating the position of the wedge block surfaces achieved by such opening;

FIG. 15 is a top plan view similar to FIGS. 9, 11 and 13 showing the hinge blocks in fully open position; and FIG. 16 is a fragmentary side elevation showing the wedge block surfaces in such fully open position.

Figure 2:
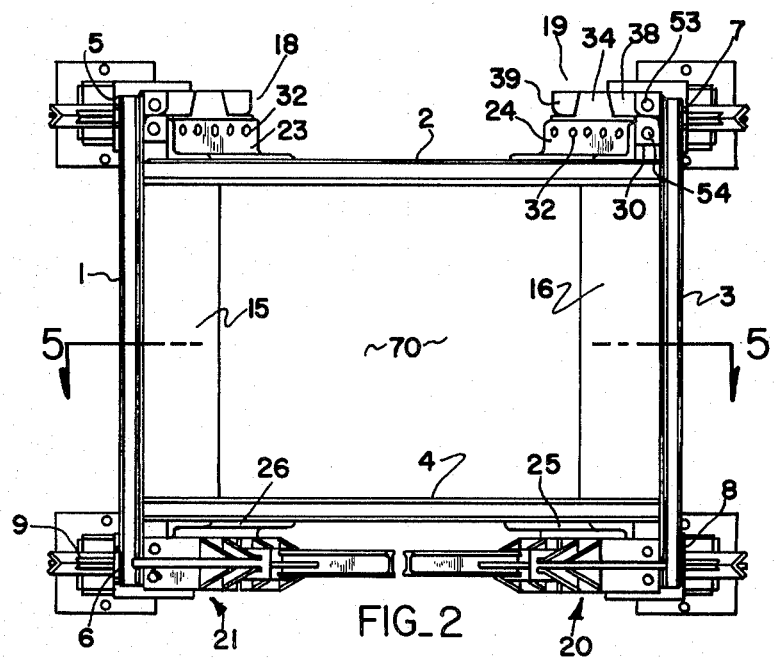
FIG. 2 is a top plan view of the molding machine of FIG. 1 with the hinge actuators at the top of such view omitted for clarity of illustration.

Referring now to the drawings and more particularly to FIGS. 1 through 5, it will be seen that the illustrated molding machine comprises a box-like structure which includes four relatively movable wall members 1, 2, 3 and 4. The walls 1 and 3 are vertically outwardly inclined and symmetrical about a plane passing vertically centrally through the machine. Such walls also extend beyond the ends of the parallel vertical walls 2 and 4. The walls 1 and 3, which may be termed permanent ends, are mounted on casters 5, 6 and 7, 8, respectively. Each of such casters include caster wheels 9 having V-shape peripheral surfaces which each mate with and ride on inverted V-shape rails 10. The outer end of each rail is curved upwardly as shown at 11 at approximately the same radius as the wheel 9 to provide an outer stop for movement of the caster wheels. Each of the rails 10 is mounted on a cubic block of rubber 12 which is in turn mounted in a base 13 secured to the floor F. The permanent ends 1 and 3 are thus supported on the floor F for short distance movement along the rails 10.

Supported by the permanent ends 1 and 3 are the parallel temporary ends 2 and 4 extending therebetween. The temporary ends 2 and 4 are in the form of an inverted isosceles trapezoid with the angle between the vertical edges thereof corresponding to the angle between the faces of the permanent ends 1 and 3. In the closed position of the box, the vertical edges of the temporary ends 2 and 4 will abut and closely contact the inclined interior faces 15 and 16 of the permanent ends 1 and 3.

The permanent and temporary ends are hingedly interconnected at each corner of the box-like frame by hinge structures 18, 19, 20 and 21. Such hinge structures are allochirally identical in form and accordingly only one such hinge will be described in detail. The outer faces of the temporary ends 2 and 4 are provided with heavy duty angle irons as indicated at 23, 24, 25 and 26. These angle irons 23 through 26 are firmly secured to the outer faces of the temporary ends 2 and 4 and the outwardly projecting leg of each extends parallel to the inclined lateral edges of such temporary ends and is spaced therefrom a distance equal to the width of hinge blocks 30. Such hinge blocks, as seen in FIGS. 7 and 8, are provided with a series of vertically equally spaced tapped apertures 31 whereby they may firmly be secured as by fasteners 32 to the outwardly projecting legs of the angles 23 through 26. In the closed position of the box as seen in FIG. 2, the inclined inner faces 15 and 16 of the permanent ends 1 and 3, respectively, will then abut not only against the inlcined lateral edges of the temporary ends 2 and 4, but also against the sides 33 of such hinge blocks 30. Such blocks are provided with outwardly projecting center portions 34 which include beveled top and bottom surfaces 35 and 36. The extensions 34 of the blocks 30 project centrally from the blocks and are of the same width as the blocks as seen in FIG. 8.

The interior lateral edges of the permanent ends 1 and 3 are each provided with vertically spaced hinge blocks 38 and 39 as seen perhaps more clearly in FIG. 6. Such blocks are in axial alignment and are positioned slightly laterally beyond the edges of the permanent ends and may be rigidly fixed thereto as by welding. The blocks 38 and 39 are of the same sectional dimension as the major extent of the blocks 30. The upper blocks 38 are provided with lower beveled surfaces 40 and the lower blocks 39 are provided with upper beveled surfaces 41. These surfaces may be precisely spaced and correspond to the surfaces 35 and 36 on the projections 34 of the blocks 30 secured to the angle legs on the edges of the temporary ends 2 and 4. In the closed position of the hinge 21, for example, the block 30 will move to a position behind and adjacent the blocks 38 and 39 as seen in FIG. 6 with the surfaces 35 and 36 engaging the surfaces 40 and 41, respectively, to form a tight wedging lock for the hinge structure.

Such relative movement of the hinge blocks may be obtained by hinge actuators 43 and 44 shown in FIGS. 1 through 4 for the hinges 20 and 21, respectively. Each of the hinge actuators for the hinges 18 through 21 may be identical in form and accordingly only the hinge actuator 44 will be described in detail. Such actuator 44 includes an outwardly extending I-beam 45 which may be employed as a manual operator. The proximal end of the operator may be provided with a channel 46 extending normal thereto enclosing and secured to ridges 47 and 48 of hinge links 49 and 50, respectively. The ridges 47 and 48 of the links are the stems of the T-shape links. The distal or outer ends of the links are bent to extend substantially horizontal and are provided with hinge pins 51 and 52 which project into the apertures 53 and 54 at the tops of the blocks 38 and 30. Identical hinge pins will project upwardly from the link 50 into apertures 55 and 56 in the bottom of the block 39 and the bottom of the block 30. The channel portion 46 may be secured to the ridges 47 and 48 of the hinge links 49 and 50, respectively by suitable fasteners 57, with such fasteners being four in number and two each passing through the respective ridges of the links.

Figure 1:
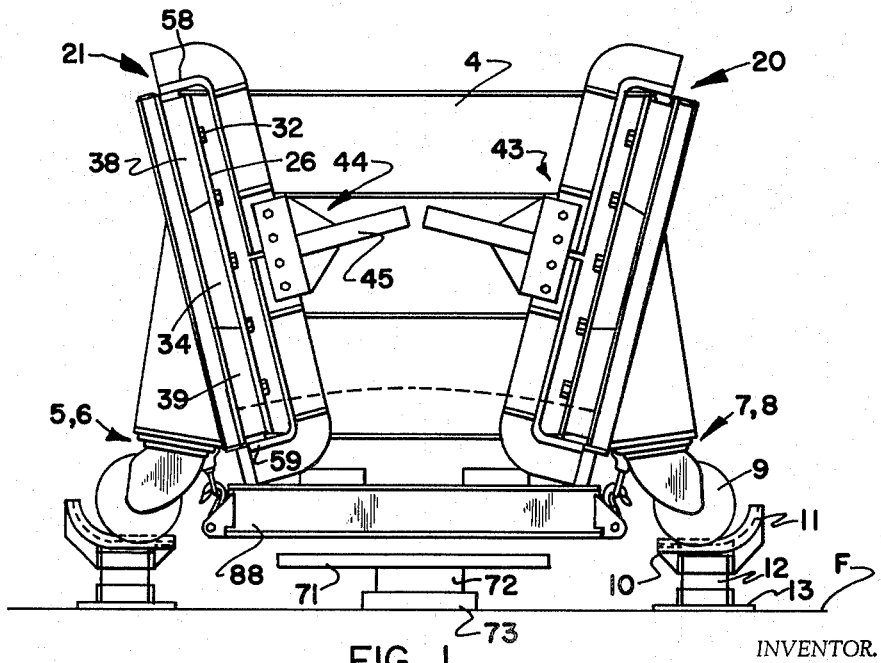
FIG. 1 is a side elevation of a molding machine in accordance with the present invention shown in its closed position.

With the hinge links 49 and 50 thus firmly held together by the hinge actuator channel, it can readily be seen that the hinge pins projecting from the parallel ends 58 and 59 thereof into the hinge block pin apertures 53, 54, 55 and 56 through suitable thrust bearings will maintain the hinge blocks 38, 39 and 30 in the required alignment in both the open and closed position thereof. When the actuators extend outwardly of the temporary ends 2 and 4, as seen in FIGS. 3 and 4, the hinges 18 through 21 will be in the open position as seen in such figures. When the actuators 44 extend substantially parallel to the temporary ends 2 and 4 as seen in FIGS. 1 and 2, the hinges will be closed and accordingly also the mold box.

As seen more clearly in FIGS. 9 through 16, the hinge blocks 30, 38 and 39 are provided with rounded cooperating vertical edges 62 and 63 with the center of such curved surfaces being the centers 64 and 65 of such blocks, respectively. Due to the connecting links 49 and 50, such curved surfaces 62 and 63 will always be maintained tangent to each other providing a line contact 66 between the hinge blocks at all times. Such line contact will, of course, be vertically interrupted by the intermediate projection 34 on the hinge block 30 and the space between the inclined surfaces 40 and 41 between the hinge blocks 38 and 39 secured to the permanent ends.

The progressive opening of a hinge as shown in FIGS. 9, 11, 13 and 15 may be taken from a plane normal to the axes of the hinge blocks of the hinge 19 as seen in FIGS. 2 and 4. The closed position of the hinge shown in FIGS. 9 and 10 would correspond to the closed position shown in FIG. 2 and the open position of the hinge shown in FIGS. 15 and 16 would correspond to the open position shown in FIG. 4.

As the actuator arm 45 is swung slightly outwardly or inclined with respect to the plane of the temporary end 2, the pivot apertures 53 and 54 will shift accordingly and since the blocks 38 and 39 are secured to the vertical inner edge of the permanent end 3, such block will remain stationary with respect to such permanent end. Similarly, the block 30 is rigidly secured to the angle 24 secured to the exterior of the temporary end 2 and accordingly such block 30 will always be stationary with respect to the temporary end. In FIG. 11, the movement of the hinge actuator will then cause the contact 66 or the point of tangency between the curved surfaces 62 and 63 to shift approximately 30° from the vertical planes passing through the centers 64 an 65 in FIG. 9. The tight joint shown in FIG. 10 between the surfaces 40 an 35 on the blocks 38 an 30, respectively, may then open approximately ⅜ of an inch as seen in FIG. 12.

In FIG. 13, the blocks are rotated approximately 60° with the line contact 66 shifting further about the rounded quadrants of the blocks and as seen in FIG. 14, the opening may now be approximately 11/16 of an inch between the surfaces 35 and 40. In the full open position as seen in FIG. 15, the hinge blocks will have rotated with respect to each other a full 90° and the block surfaces 35 and 40 may now be separated approximately ¾ of an inch. Such inclined surfaces 35, 40 and, of course, 41 may be inclined approximately 15° with respect to the axes of the blocks. If desired, special inserts may be provided for the surfaces 35, 36, 40 and 41 which may be adjustable to compensate for wear and ensure the proper wedge seating of such surfaces during continued operation of the machine.

As the hinges open, it will be seen in comparing FIGS. 2 and 4 that the permanent ends 1 and 3 have moved from the closed position outwardly along the rails 10 until the caster wheels 9 abut against the up-curved stops 11 on the ends of the rails. The opening of the hinges 18 through 21 thus moves the permanent ends outwardly away from each other along the supporting rails 10. Similarly, the temporary ends 2 and 4 supported by the hinge mechanisms on the permanent ends also move outwardly a distance equal to the distance between the hinge centers 64 and 65. Thus the mold box will be substantially peripherally enlarged or expanded in its open position and yet the walls thereof still completely connected together.

To close the bottom of the mold box formed by the permanent and temporary ends, there is provided a pattern 70 which may be supported for positioning and stripping on a stripping table 71 in turn supported on piston 72 in vertically extending cylinder 73. The pattern 70 has a curved top surface 75 which may be of the same center as the furnace to be lined by the refractory block to be produced. The flat surface 76 of the pattern 70 is provided with elongated recesses 77 and 78 which may accommodate the lifting tines of a forklift truck enabling the pattern readily to be positioned on the table 71 for the proper situation within the mold box. The pattern thus may also serve as a pallet for the removal and subsequent handling of the refractory block to be molded.

The ends 79 and 80 of the block as seen in FIG. 4 are parallel and spaced substantially precisely the distance between the interior faces of the temporary ends 2 and 4 in their closed position as seen in FIG. 2. The side edges 81 and 82 of the pattern 70 are provided with shoulders 83 and 84, respectively, undercut as more clearly seen in FIG. 5, which readily accommodate and firmly seat the bottom edges 85 and 86 of the permanent ends 1 and 3, respectively.

The pattern 70 may be properly vertically positioned with respect to the ends 1 through 4 of the mold box by means of the table 71 and when in such proper vertical position, the hinges may be closed and, of course, the bottom edges 85 and 86 of the permanent ends 1 and 3 will seat on the shoulders 83 and 84 forming the rigid upwardly opening now bottom closed mold box. The pattern 70, which is sometimes termed in the art an egg crate, may be supported by transverse beams 88 provided at their ends with pivotally mounted hooks 89 and 90. The hooks 89 and 90 may be removably secured to eyes 91 and 92, respectively, the shanks of which extend through collars 93 secured to the exterior of the permanent ends as seen more clearly in FIG. 6. The ends of the shanks of the eyes may be pivotally connected at 94 to links 95, the opposite ends of which are pivoted at 96 to toggle handles 97 which are in turn pivoted at 98 to the bracket 99 for the collar 93 secured to the permanent ends. Thus when the hook 89 is secured within the eye 91, and the handle 97 is pivoted in a clockwise direction as seen in FIG. 6, the link 95 will be elevated and when the pivot 96 moves beyond the line between the pivots 98 and 94, the eyes 91 will be toggled locked in elevated position firmly suspending the support beams 88 beneath the egg crate pattern 70 permitting the table 71 to be withdrawn therefrom. The beams 88 also more rigidly interconnect the permanent ends 1 and 3 in the closed condition of the mold box. FIG. 1 illustrates the beams 88 in their toggle locked supported position, whereas FIG. 3 illustrates the eyes 91 and 92 in their toggle unlocked position.

Referring now to FIG. 5, it can be seen that the top of the mold box will be closed by a follower plate 100 which is curved providing a bottom arcuate surface 101 having the same center as the curved top surface 75 of the egg crate pattern 70. The follower plate 100 will be of the same width as the egg crate pattern 70 so as to fit closely between the temporary ends 2 and 4 in the closed position of the mold box. However, the arcuate extent of the follower plate 100 is, of course, considerably greater than the arcuate extent of the curved surface 75 of the egg crate pattern due to the outward inclination of the permanent ends 1 and 3. The edges 102 and 103 of the follower plate extend vertically and are closely confined between the vertical walls 104 and 105 of removable guides 106 and 107, respectively, which may be mounted on the upper edges of the permanent ends 1 and 3. The follower plate 100 will be quite heavy to facilitate its descent compacting the mix M of refractory materials.

A vibrator 108, either electrical or pneumatic, may be mounted on support 109 centrally on top of the follower plate to drive the same for such downward movement and to facilitate the compaction of the refractory grains and bonding material. Vibrators 110 and 111 may also be mounted on plates 112 and 113, respectively, on the exteriors of the permanent ends 1 and 3 facilitating the flow and compaction of the hot refractory mix M. It, of course, will be understood that a vertically extending ram may be substituted for the vibrator drive 108 to provide the compaction pressure. Additionally, vertically extending guides other than the removable guide blocks 106 and 107 may be provided for the follower plate.

Since it is desirable to keep the heated mix M in a flowable condition during the compaction process, the permanent ends 1 and 3 as seen in FIG. 5 may be jacketed and a heating medium may be circulated therethrough with the fluid line connections 114 and 115 in each permanent end facilitating such fluid circulation. After the mix is compacted, the heating medium will be replaced by a cooling medium to cause the block at least partially quickly to set for stripping. The temporary ends 2 and 4 may also be of such hollow construction and jacketed for the circulation of heating and cooling mediums therethrough.

In operation, with the mold box in the open position shown in FIG. 4, the stripping table 71 will be employed properly vertically to position the egg crate pattern 70, such having been placed thereon by a fork-lift truck or other suitable conveyor. When the pattern 70 is properly positioned, the mold box may then be closed by the swinging of the hinge actuators to the positions parallel to the temporary ends 2 and 4 shown in FIGS. 1 and 2. In such closed position, the bottom edges 85 and 86 of the permanent ends will seat on the shoulders 83 and 84 on the edges of the pattern 70 as seen in FIG. 5. The beams 88 may then be hooked to the eyes 91 and 92 and toggle locked in the position shown in FIG. 1. When the hinges 18 through 21 are closed, the tight joints afforded by the beveled surfaces 35, 36, 40 and 41 of the hinge blocks 30, 38 and 39 as shown in FIG. 10 rigidly lock the permanent and temporary ends together with the lower edges 85 and 86 nested in the shoulders 83 and 84 of the pattern to form a rigid now bottom closed mold box.

When the mold box is closed, the caster wheels 9 supporting the permanent ends 1 and 3 will move from against the stops 11 to the position shown in FIG. 1. The insert guides 106 and 107 may now be mounted on the top edges of the permanent ends 1 and 2 and the box may then be filled with a refractory material such as a blend of preheated refractory grains and hot coal tar pitch which also has been preheated to render the same more liquid. The grains may be preheated to 225° F. to 325° F. Reference may be had to the U.S. patent to Samuel Rusoff et al. No. 3,015,850 for a more complete disclosure of a tar bonded refractory material that may be used with the present invention. The mix M may be dumped into the molding box by means of an overhead crane or conveyor system or from a permanent hopper fed by such conveyor system.

A strike off may be employed to preshape the top surface of the mix M generally to conform to the underside 101 of the follower 100. The follower is then lowered into place on top of the mix and vibrators 108, 110 and 111 may now be energized. Since the particular refractory material employed will tend to set up or harden when cooled, a heating medium may initially be circulated through the jacketed permanent ends as well as the temporary ends 2 and 4. This circulation of the heating medium may continue during the molding operation. The vibration of the follower 100 will cause the same to descend by gravity compacting the mix M to the finish line L adjacent the bottoms of the wedge guide inserts 106 and 107. The vibrators 110 and 111 will facilitate the flow of the refractory material and its compaction. When the material has thus been properly compacted, the heating medium may now be replaced by a cooling medium to permit the walls of the molded block sufficiently to rigidify so that the mold may be stripped from the machine and subsequently handled.

Generally, only sufficient coolant will be necessary to rigidify the sides of the block to prevent slump as the block is removed. The specially formed hinges 18 through 21 in the locked position shown in FIG. 2 readily transmit the vibrations obtained from the vibrators 110 and 111 mounted on the permanent ends throughout the mold box. It is noted that the mold box in its molding condition is not otherwise supported except on the caster wheels 9 which are in turn mounted on the rails 10, in turn mounted on the rubber blocks 12 which serve as vibration isolators for the entire molding machine.

After sufficient coolant has been circulated through the jacketed ends, and the walls of the block have been set sufficiently rigid to permit stripping, the follower plate 100 will be removed. After the I-beams 88 are disconnected or released by the toggle latch means shown in FIG. 6 and the stripping table 71 is properly vertically elevated to support the egg crate pattern 70 and the molded block, the mold will be opened by actuation of the hinges. As the hinges 18 through 21 open, the permanent ends 1 and 3 move outwardly along the supporting rails 10 until the casters 9 move against the outside stops 11. Simultaneously, the temporary ends 2 and 4 also move outwardly completely to clear vertically the pattern 70 from the bottom periphery of the mold box. The operation of vibrators 110 and 111 may be continued long enough to ensure proper separation of the walls from the block. The permanent ends are, of course, removed from the shoulders of the bottom pattern 70 and with the molded block sufficiently rigidified, the piston 72 may be elevated moving the molded block upwardly through the mold box. The notches 77 and 78 in the bottom pattern then may be employed with a fork-lift truck so that the molded block may be removed from the machine with the pattern serving as a pallet. A fork-lift truck may now place a further egg crate pattern 70 on the table 71 to be vertically properly positioned for the closing of the mold and the above cycle may now be repeated for molding another block.

Since the hinge blocks on the permanent and temporary ends are always maintained in line contact with such being the point of tangency between the opposed curved surfaces thereof, it will be seen that the mold box is firmly held together even in the open position shown in FIG. 4. However, in the closed position, the wedging surfaces 35, 36 and 40, 41 will provide a very tight wedge lock so that the vibration of the permanent ends will be transmitted to the temporary ends.

It will readily be understood that molds of different radial thicknesses may be produced simply by replacing the wedge guide inserts 106 and 107 and utilizing a larger or smaller follower accordingly. Molds of different arcuate extent or having different enclosed angles between the radial faces thereof may be made by replacing the temporary ends 2 and 4 with ends having larger or smaller included angles between the inclined vertical edges thereof. This is, of course, readily possible with the mounting of each permanent end on the axially aligned caster wheels 9. The temporary ends may readily be replaced simply by disassembling the hinges 18 through 21 by removal of the hinge pins and links. It will then be seen that with slight modification the present invention may be employed to mold large furnace refractory blocks of many different sizes.

It can now be seen that there is provided a refractory block molding machine employing a simplified mold box having the sides thereof hinged together in a unique manner to expand the mold box for stripping without completely disassembling the same. Moreover, with the hinges employed, a rigid locking is obtained to transmit compacting vibration from one wall of the box to adjacent walls. Further, the employment of the readily insertable wedge guides 106 and 107 facilitates the convenient shaping of the refractory material to the desired thickness.

Other modes of applying the principle of the invention may be employed, change being made as regards the details described, provided the features stated in any of the following claims or the equivalent of such be employed.

I, therefore, particularly point out and distinctly claim as my invention:

1. A refractory block molding machine comprising a bottom pattern having shoulders on opposite sides thereof, a mold box including inclined walls seated on said shoulders and parallel vertical walls extending between said inclined walls forming with said bottom pattern an open top mold box, means to compact a refractory material therein, means to expand said box without disassembling the same, and means vertically to move said pattern therethrough when thus expanded, said means to expand said box including hinge connections between said inclined and vertical walls, said hinge connections including wedge locking means operative rigidly to interconnect said inclined and vertical walls when the mold box is closed, and vibration means mounted on said inclined walls, said hinge connections transmitting vibration created thereby to said vertical walls.

2. A refractory block molding machine comprising a bottom pattern, a mold box including inclined walls and parallel vertical walls extending therebetween surrounding said pattern and forming therewith an open top mold box, means operative to compact a refractory material within said box to form a refractory block, and means operative to enlarge said box without disconnecting said inclined and vertical walls to facilitate stripping of such molded block therefrom, said means to enlarge said box comprising hinge connections between said inclined and vertical walls, said hinge connections including wedge lock surfaces operative rigidly to lock said inclined walls to said vertical walls.

3. A refractory block molding machine as set forth in claim 2 including vibrators mounted on said inclined walls, said hinge connection wedge locking surfaces transmitting the vibrations thereof to said vertical walls.

4. A refractory block molding machine as set forth in claim 3 including means mounting said inclined walls for movement toward and away from each other.

5. A refractory block molding machine as set forth in claim 4 wherein said last mentioned means comprises casters on said inclined walls, rail means supporting said casters, and vibration isolators supporting said rail means.

6. A refractory block molding machine comprising a bottom pattern having an arcuate top surface with shoulders on opposite sides thereof, a mold box including inclined walls seated on said shoulders and parallel vertical walls extending between said inclined walls and forming with said bottom pattern an upwardly open mold box, removable guide means mounted on the top edges of said inclined walls, an arcuate follower plate extending between said guide means, and drive means on said follower plate operative vertically to move the same to compact a refractory material within said mold box, the vertical extent of said guide means controlling the radial thickness of the finished block.

7. A refractory block molding machine comprising a bottom pattern, a mold box including four walls forming with said bottom pattern an upwardly extending mold box, means to compact a refractory material within said mold box, and means to expand said mold box for stripping of the molded block therefrom without disconnecting said walls, said means to expand said mold box comprising hinges interconnecting said walls, said hinges including hinge blocks mounted on adjacent walls respectively and having mating wedge surfaces thereon operative rigidly to lock said walls together to form said mold box when said hinges are closed.

8. A refractory block molding machine as set forth in claim 7 wherein said hinges include two vertically spaced hinge blocks on one of said walls having opposed inclined wedge locking surfaces, hinge blocks mounted on adjacent walls including a projection having oppositely directed inclined wedge locking surfaces adapted to cooperate with the wedge locking surfaces on the hinge blocks mounted on said one wall, and link means interconnecting said hinge blocks for movement between open and closed position.

9. A refractory block molding machine as set forth in claim 8 including rounded cooperating surfaces on the hinge blocks on said one and adjacent walls, respectively, said link means maintaining said hinge block rounded surfaces in line contact during opening and closing thereof.

10. A refractory block molding machine comprising a bottom pattern, a mold box including inclined walls and parallel vertical walls extending therebetween surrounding said pattern and forming therewith an open top mold box, means operative to compact a refractory material within said box to form a refractory block, and means operative to move each wall outwardly to enlarge said box without disconnecting said inclined and vertical walls to facilitate stripping of such molded block therefrom, said means to enlarge said box comprising hinge connections between each of said walls, said hinge connections being operative rigidly to lock said inclined walls to said vertical walls when said hinge connections are positioned to close said mold box.

11. The combination of claim 10 further including vertically movable means operative vertically to move said pattern and said compacted material upwardly through said box when enlarged.

12. The combination of claim 10 wherein said means operative to compact the refractory material comprises a vertically movable compacting plate, and vibrator means mounted on said plate and on said inclined walls to facilitate the compaction of such block.

13. The combination of claim 10 further including means mounting said inclined walls for movement toward and away from each other, said last mentioned means comprising casters on said inclined walls, rail means supporting said casters, and vibration isolators supporting said rail means.

14. The combination of claim 10 wherein said inclined walls are inclined outwardly and said vertical walls are in the form of inverted trapezoids, said inclined walls being supported by wheel means for movement toward and away from each other, said wheel means facilitating the replacement of said walls therebetween with walls having different included angles between the nonparallel sides thereof.

15. A refractory block molding machine comprising a bottom pattern, a mold box including first and second pairs of opposed walls surrounding said pattern and forming therewith an open top mold box, means operative to compact a refractory material within said box to form a refractory block, and means operative to move each of said walls outwardly to enlarge said box without disconnecting said pairs of opposed walls to facilitate stripping of such molded block therefrom, said means operative to enarge said box comprising hinge connections between each of said walls, said hinge connections being operative rigidly to lock each of said walls to the adjacent walls when said hinge connections are positioned to close said mold box.

References Cited by the Examiner
UNITED STATES PATENTS

| | | | |
|---|---|---|---|
| 374,938 | 12/1887 | Carman | 25—103 |
| 797,758 | 8/1905 | Sterling | 25—41 |
| 810,300 | 1/1906 | Pettct | 25—41 |
| 826,290 | 7/1906 | Timby | 25—121 |
| 856,866 | 6/1907 | Hart | 25—41 |
| 896,330 | 8/1908 | Scheelky | 25—121 |
| 1,181,198 | 5/1916 | Zwicker | 25—126 |
| 1,431,565 | 10/1922 | Buente. | |
| 1,486,056 | 3/1924 | Straub | 25—121 |
| 1,603,917 | 10/1926 | Johnson | 25—41 |
| 1,767,163 | 6/1930 | Ackermann | 25—121 |
| 2,407,168 | 9/1946 | Lindkvist | 25—41 |
| 2,446,061 | 7/1948 | Reed | 25—41 |
| 2,836,873 | 6/1958 | Lingl | 25—120 |
| 2,887,722 | 5/1959 | Bauers. | |
| 2,916,795 | 12/1959 | Henderson | 25—121 |

FOREIGN PATENTS

| | | |
|---|---|---|
| 532,107 | 11/1921 | France. |
| 1,095,530 | 12/1954 | France. |
| 1,234,078 | 5/1960 | France. |
| 1,045,303 | 11/1958 | Germany. |
| 183,948 | 8/1936 | Switzerland. |

J. SPENCER OVERHOLSER, *Primary Examiner.*

ROBERT F. WHITE, MICHAEL V. BRINDISI, WILLIAM J. STEPHENSON, *Examiners.*